(12) United States Patent
Nakajima

(10) Patent No.: US 7,131,361 B2
(45) Date of Patent: Nov. 7, 2006

(54) WORKPIECE-TRANSFER DEVICE

(75) Inventor: Akio Nakajima, Aichi (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/400,833

(22) Filed: Sep. 21, 1999

(65) Prior Publication Data

US 2002/0092390 A1    Jul. 18, 2002

(30) Foreign Application Priority Data

Oct. 9, 1998    (JP) .............................. 10-287954

(51) Int. Cl.
*B26D 7/06* (2006.01)

(52) U.S. Cl. .......................... 83/100; 83/152; 83/279; 83/280; 83/277; 414/793; 414/797

(58) Field of Classification Search ................. 83/279, 83/280, 435.11, 152, 107, 277, 100, 276; 414/796.9, 797, 796.5, 796.4, 793
See application file for complete search history.

(56) References Cited

U.S. PATENT DOCUMENTS

| | | | |
|---|---|---|---|
| 3,776,398 A * | 12/1973 | Struart et al. ............ | 414/796.9 |
| 3,830,121 A * | 8/1974 | Makeev et al. ........... | 83/81 |
| 4,140,258 A * | 2/1979 | Gray ........................ | 83/152 |
| 4,465,426 A * | 8/1984 | Jonsson ................... | 414/751 |
| 4,565,478 A * | 1/1986 | Ericsson .................. | 414/71 |
| 4,709,605 A * | 12/1987 | Clark ....................... | 83/23 |
| 4,804,173 A * | 2/1989 | Pol et al. ................. | 271/11 |
| 4,879,931 A * | 11/1989 | Jenkner .................... | 83/152 |
| 4,950,128 A | 8/1990 | Sala | |
| 5,036,736 A | 8/1991 | Hillock et al. | |
| 5,120,178 A | 6/1992 | Ito | |
| 5,244,343 A * | 9/1993 | Lockert ................... | 414/797 |
| 5,311,799 A * | 5/1994 | Mohr ....................... | 83/280 |
| 5,358,375 A * | 10/1994 | Kawada et al. .......... | 414/277 |
| 5,372,473 A * | 12/1994 | Moyden et al. ......... | 414/788.4 |
| 5,386,751 A | 2/1995 | Dylla et al. | |
| 5,400,652 A * | 3/1995 | Haar ........................ | 83/206 |
| 5,460,478 A * | 10/1995 | Akimoto et al. ........ | 414/786 |
| 5,507,616 A * | 4/1996 | Perobelli et al. ........ | 414/789.5 |
| 5,564,893 A * | 10/1996 | Tacchi et al. ............ | 414/796.9 |

(Continued)

FOREIGN PATENT DOCUMENTS

JP    62-166031    7/1987

*Primary Examiner*—Boyer D. Ashley
*Assistant Examiner*—Omar Flores Sánchez
(74) *Attorney, Agent, or Firm*—Westerman, Hattori, Daniels & Adrian, LLP

(57) ABSTRACT

The present invention provides a workpiece-transfer device that has functions for both loading and unloading workpieces, without requiring a workpiece-storage device to enable a function for replacing material and product workpieces with each other, and that requires only a simple configuration and low costs. A workpiece-transfer device loads a material workpiece W1 in a workpiece-machining device 1 and unloads a product workpiece W2 from the workpiece-machining device 1. A movement means with a rectangular coordinate system 30 is provided to move a traveling body 27 in a first direction along the direction in which the workpiece-machining device 1 and a workpiece-storage device 2 stand in a line (direction X) as well as in a second horizontal direction orthogonal to the first direction (direction Y). The traveling body 27 includes a gripping means 28 for gripping a material or product workpiece W1 and W2.

13 Claims, 10 Drawing Sheets

U.S. PATENT DOCUMENTS

| | | | |
|---|---|---|---|
| 5,630,692 A * | 5/1997 | Hanaya | 414/277 |
| 5,692,292 A * | 12/1997 | Asai et al. | 414/273 |
| 5,765,984 A * | 6/1998 | Stefano et al. | 414/222 |
| 5,813,826 A * | 9/1998 | Martin et al. | 414/797 |
| 5,839,877 A * | 11/1998 | Kikuchi et al. | 414/797 |
| 5,889,547 A | 3/1999 | Rombult et al. | |
| 5,971,456 A * | 10/1999 | Van Capelleveen | 414/796.9 |
| 6,006,638 A * | 12/1999 | Eltringham | 83/152 |
| 6,055,895 A * | 5/2000 | Kanazawa | 83/152 |
| 6,062,799 A * | 5/2000 | Han et al. | 414/416 |
| 6,216,572 B1 * | 4/2001 | Raimondi | 83/86 |
| 6,264,419 B1 * | 7/2001 | Schinzel | 414/751.1 |

* cited by examiner

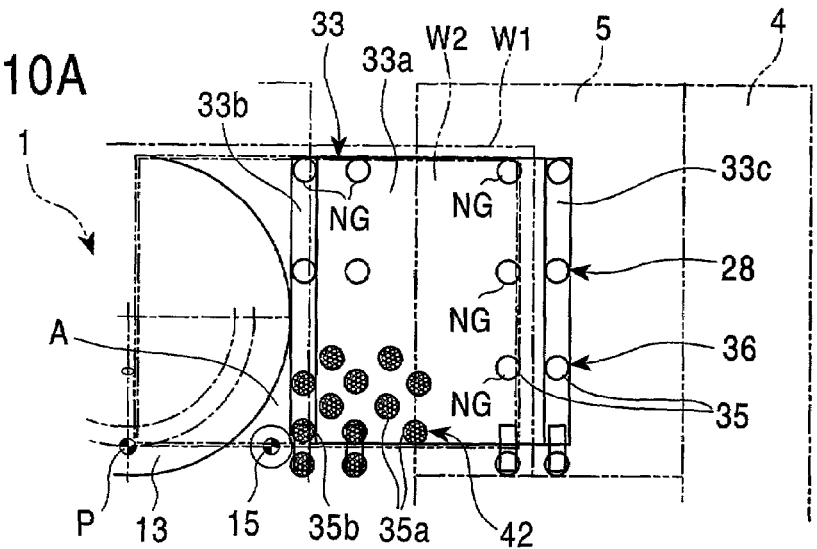
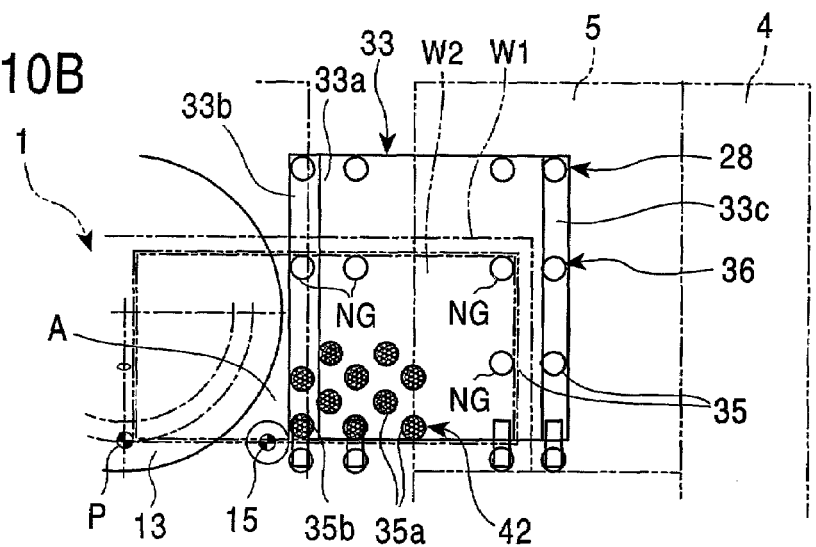
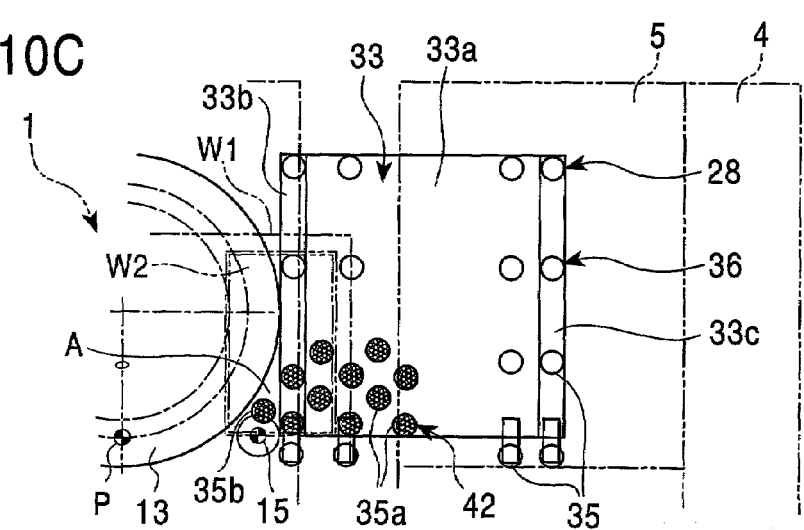

WORKPIECE-TRANSFER DEVICE

FIELD OF THE INVENTION

The present invention relates to a workpiece-transfer device for loading a material workpiece, such as a sheet, a sheetmetal, in a workpiece-machining device and unloading a product workpiece therefrom.

BACKGROUND OF THE INVENTION

A loader or an unloader annexed to a workpiece-machining device conventionally comprises a traveling body that travels in the direction in which a workpiece-machining device and a workpiece-storage device are separated from each other, the traveling body having suction pads to suck the top surface of a workpiece for transfer. Such a loader and an unloader are designed to be independent of each other or to share rails for the traveling body.

The conventional loader and unloader execute loading and unloading exclusively, so both devices must be installed in order to perform both of these operations, resulting in the complicated configuration of the entire device and increased costs. Due to the use of shared parts, the loader and unloader sharing the rails for the traveling body simplifies the configuration and reduces costs compared to exclusive devices that are independent of each other, but the degree of simplification and cost reduction are insufficient.

Therefore, attempts were made to develop devices capable of loading material workpieces and unloading product workpieces using the same traveling body. Nonetheless, under a configuration in which the traveling body travels in only one direction along the direction in which the workpiece-machining device and the workpiece-storage device are separated from each other, as in the conventional loader and unloader, if the device is used for both loading and unloading, the position at which material workpieces are stored is also used as the position to which product workpieces are unloaded. Consequently, in the workpiece-storage device at which material workpieces and product workpieces are stored, a mechanism is required that can be frequently moved to move a pallet in the direction orthogonal to the direction for each material, complicating the configuration of the workpiece-storage device and increasing costs. Although the material and product housing positions can be located parallel to each other in the above direction, the resulting processing line overextends and undesirably occupies a large area of the factory.

In addition, since the conventional unloader is designed to move the traveling body in only the above direction, if product workpieces obtained by cutting a material workpiece are to be sorted depending on their type or blanking condition, a sorting device that is moved in the direction orthogonal to the above direction is required in the workpiece-storage device. This also increases costs.

Furthermore, in the conventional loader, the traveling body can be moved in only one direction, so when a material workpiece is positioned on a table of the workpiece-machining device, some of the suction pads must act as positioning pads that can be moved in diagonal directions relative to the traveling body, complicating the configuration.

An object of the present invention is to provide a workpiece-transfer device that has functions for loading and unloading workpieces without requiring the workpiece-storage device to have a function for replacing material and product workpieces with each other, and that requires only a simple configuration that entails low costs.

Another object of the present invention is to provide a square layout of the entire facility, including the workpiece-machining device and the workpiece-storage device, in order to more effectively use the floor area.

Yet another object of the present invention is to enable material workpieces to be loaded and positioned on the workpiece-machining device without requiring an exclusive positioning means such as positioning pads.

SUMMARY OF THE INVENTION

A workpiece-transfer device according to the present invention is a workpiece-transfer device for loading a material workpiece in a workpiece-machining device and unloading a machined product workpiece from the workpiece-machining device, wherein the workpiece-transfer device includes a movement means with a rectangular coordinate system for moving a traveling body in a first direction along the direction in which the workpiece-machining device and a workpiece-storage device stand in a line, as well as in a second horizontal direction orthogonal to the first direction, and wherein the traveling body includes a gripping means for gripping a material or product workpiece.

According to this configuration, after the gripping means of the traveling body grips a material workpiece in the workpiece-storage device, the traveling body can be moved in the first direction to load the material workpiece in the workpiece-machining device. In addition, after the gripping means of the traveling body grips a product workpiece machined by the workpiece-machining device, the traveling body can be moved in the first direction to unload the product material to the workpiece-storage device. In this case, moving the traveling body in the second direction can accommodate a difference between the loading positions of material and product workpieces in the workpiece-storage device in the second direction. This configuration provides both functions for loading and unloading workpieces without requiring the workpiece-storage device to have a function for replacing material and product workpieces with each other, and requires only a simple configuration and low costs.

According to the present invention, the workpiece-storage-device comprises a product-housing section and a material-housing section provided parallel to each other in the second direction. The arrangement of the product- and material-housing sections may be set so as not to exceed the arrangement range of the workpiece-machining device along the second direction.

This configuration provides a square layout of the facility, including the workpiece-machining device, the workpiece-storage device, and the workpiece-transfer device. Such a square layout enables the floor area of the factory to be used more effectively.

According to the present invention, the workpiece-storage device has a product-housing section and a material-housing section, and the rectangular coordinate system movement means can move the traveling body to the product- and material-housing sections so that the traveling body can be moved into position and load a material workpiece gripped by the gripping means of the traveling body, relative to a positioning member of the workpiece-machining device.

The traveling body can be moved in the first direction and in the second direction orthogonal to the first direction, as described above, so by moving the traveling body, a material gripped by the gripping means of the traveling body can be positioned relative to the positioning member of the workpiece-machining device. This configuration eliminates the need for the traveling body to have an exclusive positioning mechanism used in loading materials, e.g., positioning pads, thereby further simplifying the configuration and reducing costs.

BRIEF DESCRIPTION OF THE DRAWING

FIGS. 10A to 10B and 10C are explanatory drawings showing in top view another form of material-unloading operation by the workpiece-transfer device.

DETAILED DESCRIPTION OF THE PREFERRED EMBODIMENTS

Figure 1:
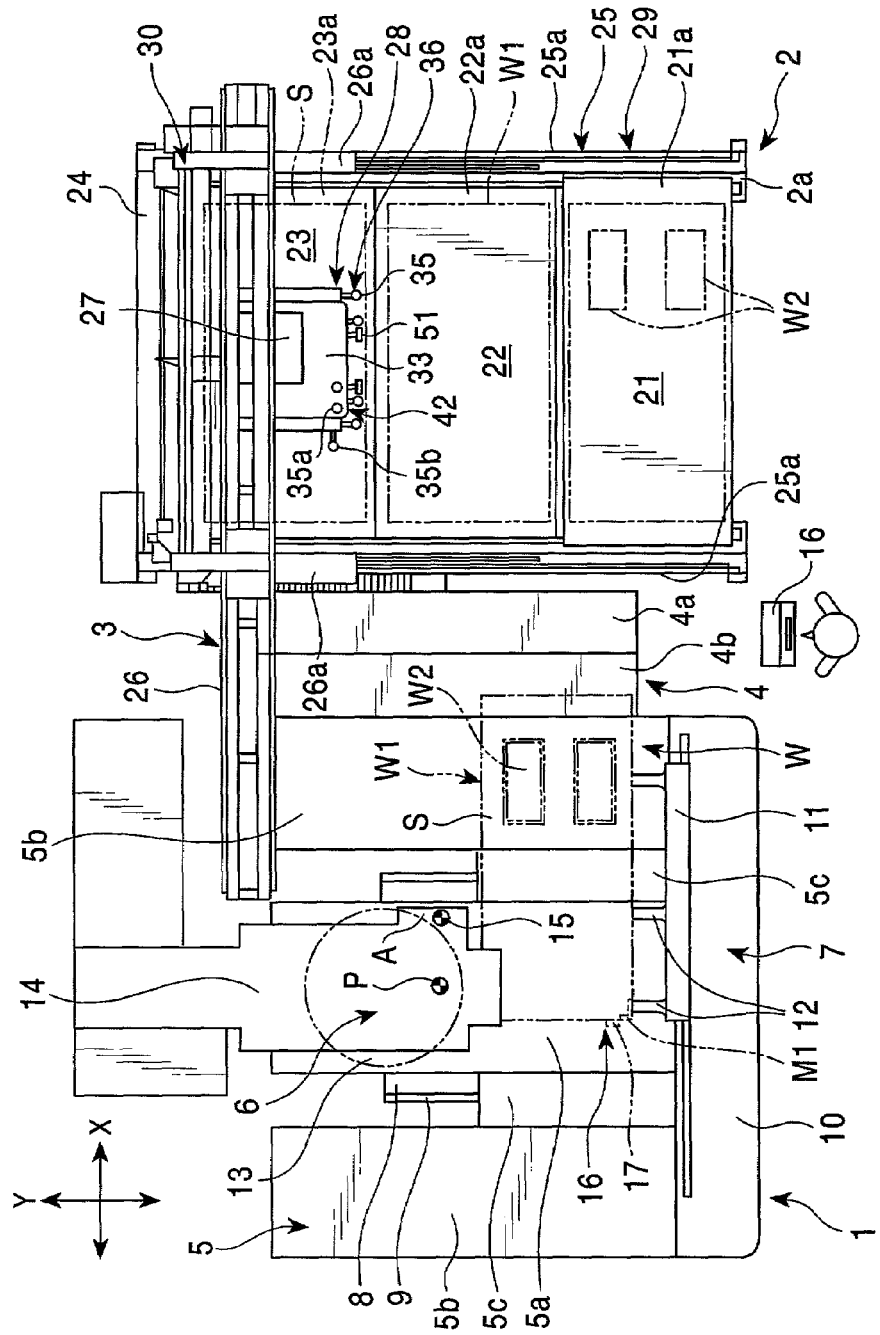
FIG. 1 is a top view of a workpiece-machining facility in which a workpiece-transfer device according to one embodiment of the present invention is combined with a workpiece-machining device and a workpiece-storage device.
Figure 2:
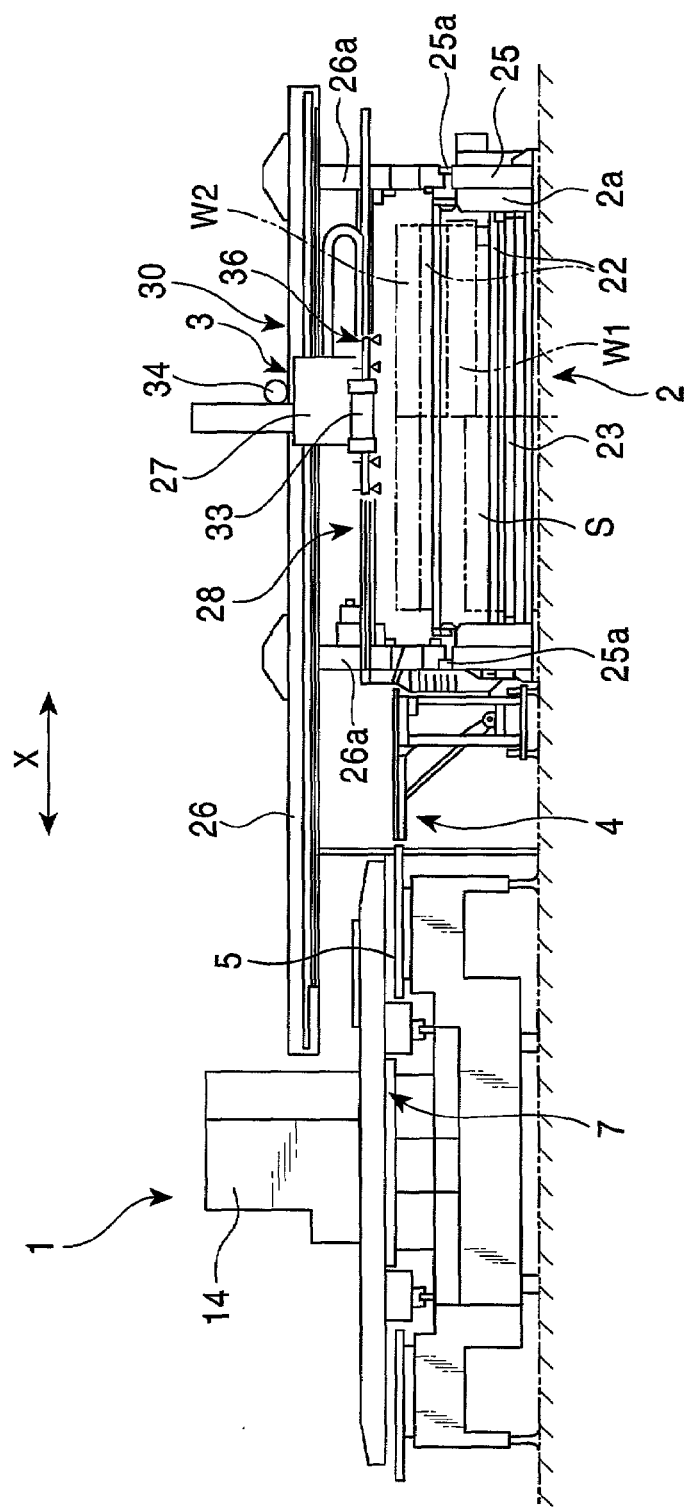
FIG. 2 is a front view of the workpiece-machining facility.
Figure 3:
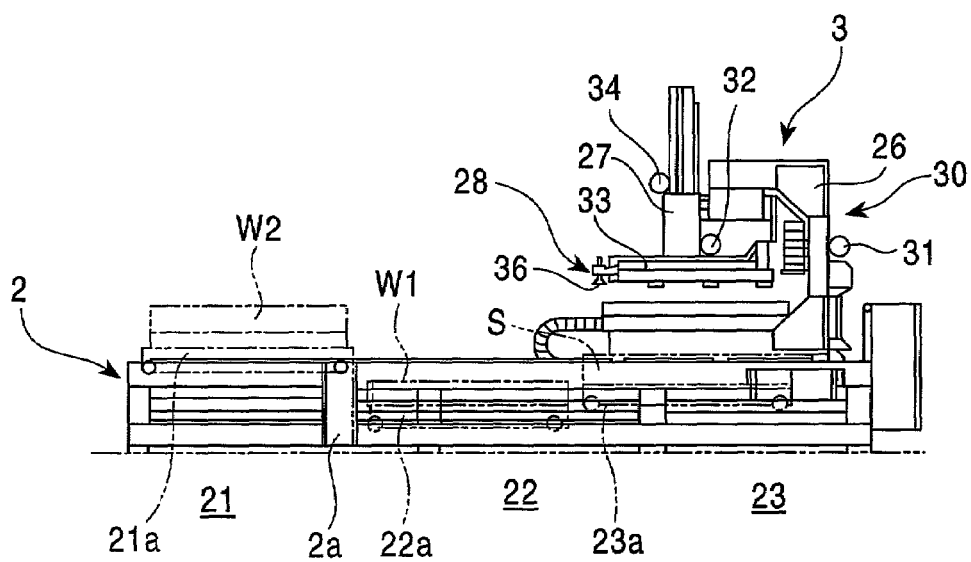
FIG. 3 is a side view of the workpiece-machining facility.

One embodiment of the present invention is described in conjunction with the FIGS. 1 to 11. As shown in the top view in FIG. 1, a workpiece-storage device 2 is installed at the side of a workpiece-machining device 1, and a workpiece-transfer device 3 for transferring a workpiece W (material workpiece W1 and a product workpiece W2) is installed between the workpiece-machining device 1 and the workpiece-storage device 2. The workpiece-machining device 1 and the workpiece-storage device 2 are placed at small intervals so that an auxiliary table 4 may be installed between these devices and so that a control panel 16 may be installed between them and in front of them.

The workpiece-machining device 1 comprises a table 5 on which the workpiece W is placed, a machining section 6 for machining the workpiece W on the table 5, and a workpiece-feeding device 7 for moving the workpiece W located on the table 5. In the workpiece-feeding device 7, a cross slide 11 capable of moving in the lateral direction (the direction of the X-axis) is provided in a carriage 10 that is moved on a rail 9 of a lower frame 8 in the longitudinal direction (the direction of the Y-axis), and a plurality of workpiece holders 12 for gripping the end of the workpiece W are installed on the cross slide 11. The lateral direction (the direction of the X-axis) is the direction in which the workpiece-machining device 1 and the workpiece-storage device 2 are arranged.

The table 5 comprises a central fixed table 5a, a pair of fixed tables 5b placed on the respective sides of the fixed table 5a, and a movable table 5c between the central fixed table 5a and the lateral fixed tables 5b which is moved back and forth together with the carriage 10.

The machining section 6 is installed between an upper frame 14 above the central fixed table 5a and the lower frame 8, and is covered with a machine body. The workpiece-machining device 1 comprises a turret punch press, and the machining section 6 is chiefly composed of a vertical pair of turrets 13 and a punch drive mechanism (not shown in the drawings) for punching, at a predetermined punch position P, punch tools (not shown in the drawings) held at a plurality of circumferential positions of the turret 13. In the machining section 6, a subhead 15 is installed near the turret 13 and parallel with the punch position P. The subhead 15 is a means for cutting off from the material workpiece W1 the product workpiece W2 obtained by machining the outer circumference of the material workpiece W1 and partly connected to the material workpiece W1. The subhead 15 is composed of an exclusive punch mechanism. An end locator 17 for positioning the loaded material workpiece W1 in the lateral direction is installed on the table 5 so as to be extended and withdrawn by a drive means such as a cylinder. The end locator 17 and the workpiece holder 12 act as a positioning member 16 when the material workpiece W1 is loaded in the workpiece-machining device 1.

The auxiliary table 4 has a fixed table 4a at the side of the workpiece-storage device 2 and a folding table 4b at the side of the workpiece-machining device 1 wherein the folding table 4b can be folded downward.

In the workpiece-storage device 2, a product-housing section 21 in which the product workpieces W2 are stacked and a material-housing section 22 in which the material workpieces W1 are stacked are arranged in the direction orthogonal to the direction in which the workpiece-machining device 1 and the workpiece-storage device 2 are arranged. In this example, in addition to the product-housing section 21 and the material-housing section 22, a skeleton-housing section 23 is provided in which skeletons S are stacked. These housing sections 21 to 23 are arranged in the order of the product-housing section 21, the material-housing section 22, and the skeleton-housing section 23 relative to the front of the device. The skeleton S is a residual material obtained by cutting out the product workpiece W2 from the material workpiece W1 in the workpiece-machining device 1 and corresponding to the outer circumference of the material workpiece W1. The arrangement range of these housing sections 21 to 23 does not exceed the arrangement direction (the direction of the Y-axis) and range of the workpiece-machining device 1.

The product-housing section 21, the material-housing section 22, and the skeleton-housing section 23 are each configured by stopping a product pallet 21a, a material pallet 22a, and a skeleton pallet 23a, respectively, at predetermined positions in a workpiece-storage device body 2a. The pallets 21a to 23a can be moved back and forth on rails provided on the workpiece-storage device body 2a and are moved while being driven by a pallet-movement device 24. The pallet-movement device 24 is composed of, for example, endless chains connected to the respective pallets 21a to 23a and a motor that drives the chains. The rail guiding the product pallet 21a is provided higher than the rail guiding the material pallet 22a, and the material pallet 22a can pass below the product pallet 21a (see FIG. 3). Each of the pallets 21a to 23a is constantly stopped at specified positions and moved when the workpiece W etc. on the pallet is ejected.

Figure 4:
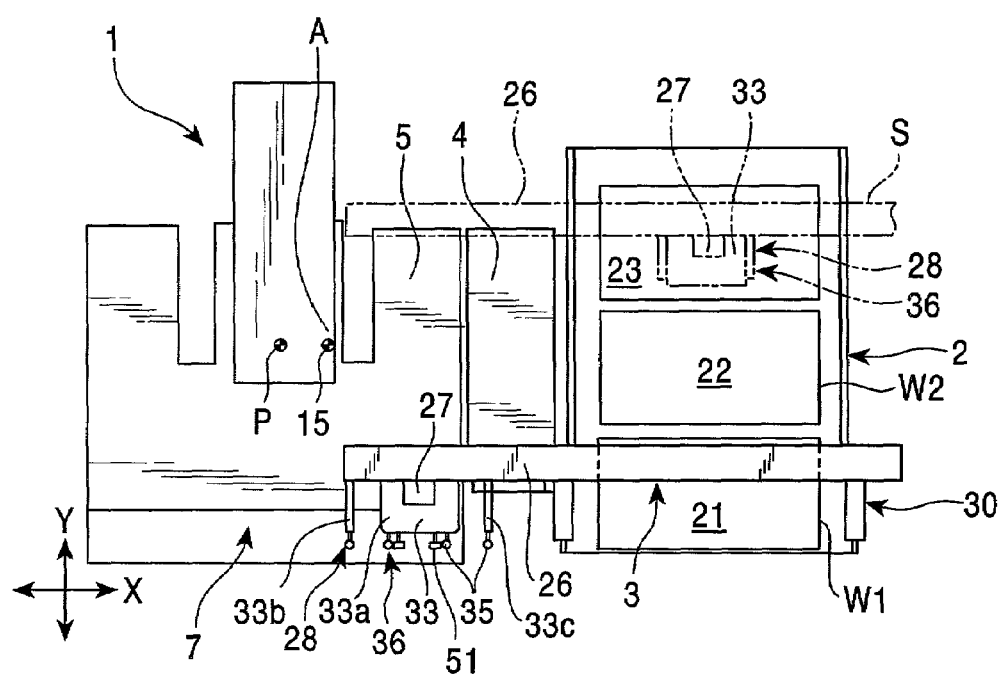
FIG. 4 is a top view showing the general operation of the workpiece-transfer device in the workpiece-machining facility.

The workpiece-transfer device 3 comprises a movable table 26 installed on the fixed table 25 and extending in the direction orthogonal to the advancing and retreating direction, a traveling body 27 installed so as to advance and retreat along the movable table 26, and a gripping means 28 for the workpiece W installed on the traveling body 27 (see FIG. 4). The movable table 26 advances and retreats in the direction orthogonal to the direction (the direction of the Y-axis) in which the workpiece-machining device 1 and the workpiece-storage device 2 are separated from each other (the direction of the X-axis). The separation direction (the direction of the X-axis) is called a first direction, while the direction orthogonal to the separation direction (the direction of the Y-axis) is called a second direction. The direction in which the traveling body 27 is moved relative to the movable table 26 is the first direction (the direction of the X-axis). The fixed table 25 and the movable table 26 constitute a base 29 supporting the traveling body 27 in the orthogonal directions of the two axes, and the base 29 and drive and guide means for the respective directions constitute a movement means with a rectangular coordinate system 30 for moving the traveling body 27 in the orthogonal directions of the two axes.

The fixed table 25 comprises a pair of fixed rails 25a extending along the lateral sides of the workpiece-storage device 2. The movable table 26 is shaped like a linear frame extending on the table 5 of the workpiece-machining device 1 like a cantilever, and is installed on the pair of fixed rails 25a via a pair of legs 26a so as to advance and retreat. The tip of the movable table 26 extends to the neighborhood of a side of the upper frame 14 of the workpiece-machining device 1. The movable table 26 has a rail extending in the longitudinal direction, and the traveling body 27 is installed so as to travel along the rail. The advancing drive of the movable table 26 and the traveling drive of the traveling body 27 are carried out by drive devices 31 and 32 (FIG. 2), respectively. The movable table drive device 31 and the traveling body drive device 32 are each composed of, for example, a rack and pinion mechanism and a servo motor driving the pinion. The rectangular coordinate system movement means 30 is composed of the movable table drive device 31, the traveling body drive device 32, and the rails 25a guiding the movable table 26 and the traveling body 27. Accordingly, the drive devices 31 and 32 act as a drive device in the rectangular coordinate system movement means 30 for moving the traveling body 27 in the direction of each axis.

The traveling body 27 has a pad-mounting frame 33, on which suction pads 35 constituting a gripping means 28 are provided. The pad-mounting frame 33 is installed on the traveling body 27 so as to be elevated and lowered by an elevating device 34 installed on the traveling body 27. The elevating device 34 is composed of, for example, a rack and pinion mechanism and a servo motor driving the pinion.

The gripping means 28 is composed of a suction-pad arrangement 36 comprising a plurality of suction pads 35 attached to the pad-mounting frame 33 and arranged so as to form a plain, and grippers 52 (FIG. 5) mounted on the pad-mounting frame 33. The gripper 52 is principally used to eject the skeleton S. In addition, floaters 51 for separating the material are attached to the pad-mounting frame 33. The floater 51 magnetizes laminated material workpieces W1 to allow the top of these material workpieces W1 to be easily separated based on their magnetic repulsion.

Figure 5:
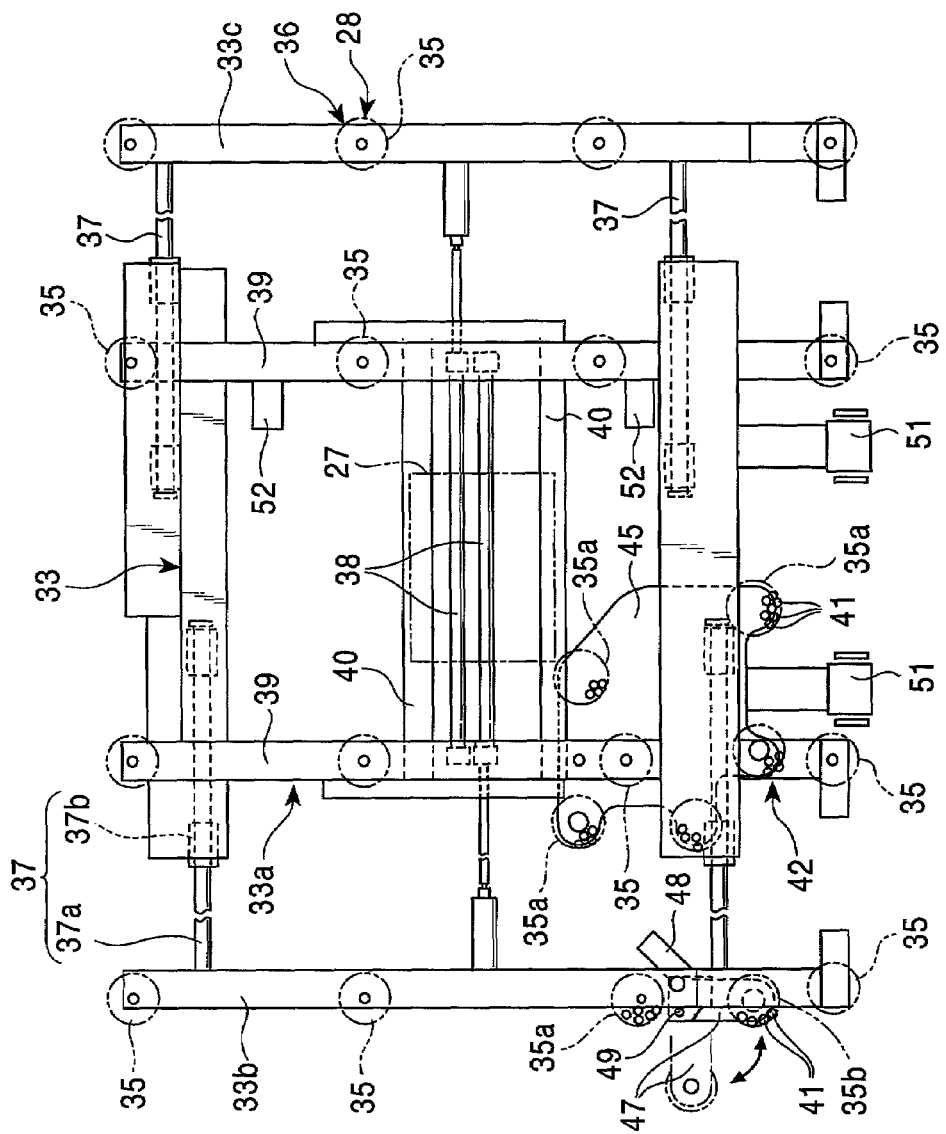
FIG. 5 is a top view showing a suction-pad arrangement of the workpiece-transfer device.

As shown in FIG. 5, the pad-mounting frame 33 is composed of a main frame 33a and stretching mounting frames 33b and 33c provided on the respective lateral sides of the main frame 33a. The main frame 33a is composed of a plurality of assembled frame materials 39 and 40. The lateral stretching frames 33b and 33c are attached to the main frame 33a via guide members 37 so as to be moved out and back by a stretching drive device 38. The guide 37 is composed of a guide rod 37a fixed to the stretching frames 33b and 33c, and a receiving member 37b provided in the main frame 33a to guide the guide rod 37a. The stretching drive device 38 comprises a fluid pressure cylinder device. The stretching drive device 38 may be composed of a rack and pinion mechanism and a motor instead of the cylinder device.

The plurality of suction pads 35 are provided on the frame materials 39 extending in the longitudinal directions (the direction of the Y-axis) of the pad-mounting frame 33 and on the lateral stretching frames 33b and 33c, wherein the suction pads 35 are arranged in the longitudinal direction. Thus, the stretching frames 33b and 33c can be moved out and back to vary the interval between the suction pads 35 attached to the main frame 33a and the suction pads 35 attached to the stretching frames 33b and 33c. The interval is varied depending on the environment of the workpiece-machining device 1 or the workpiece-storage device 2 or the size or shape of the material workpiece W1 or the product workpiece W2.

Figure 9A:
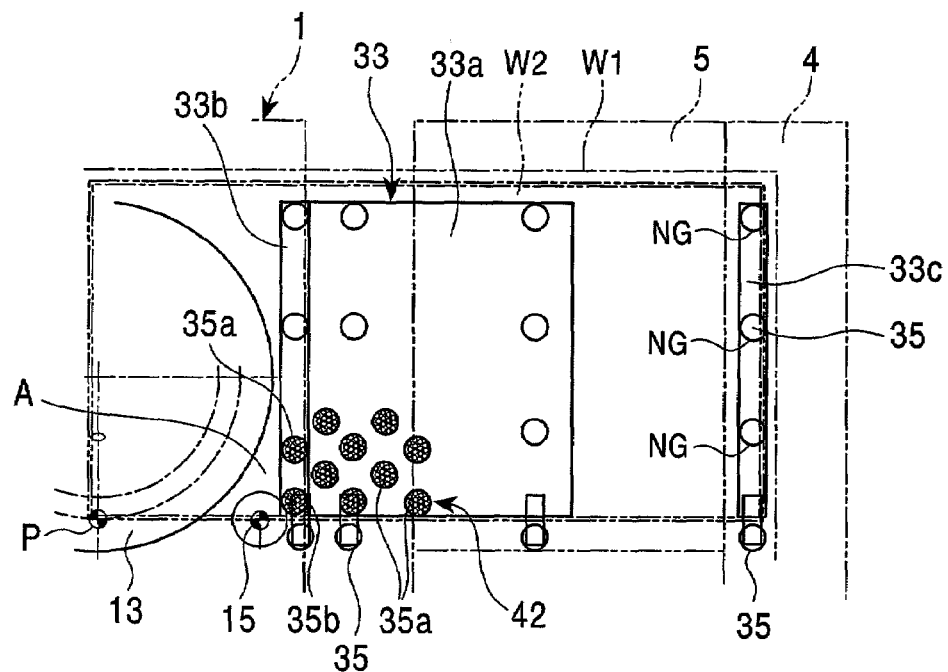
FIGS. 9A and 9B are explanatory drawings showing in top view a form of material-unloading operation by the workpiece-transfer device.
Figure 9B:
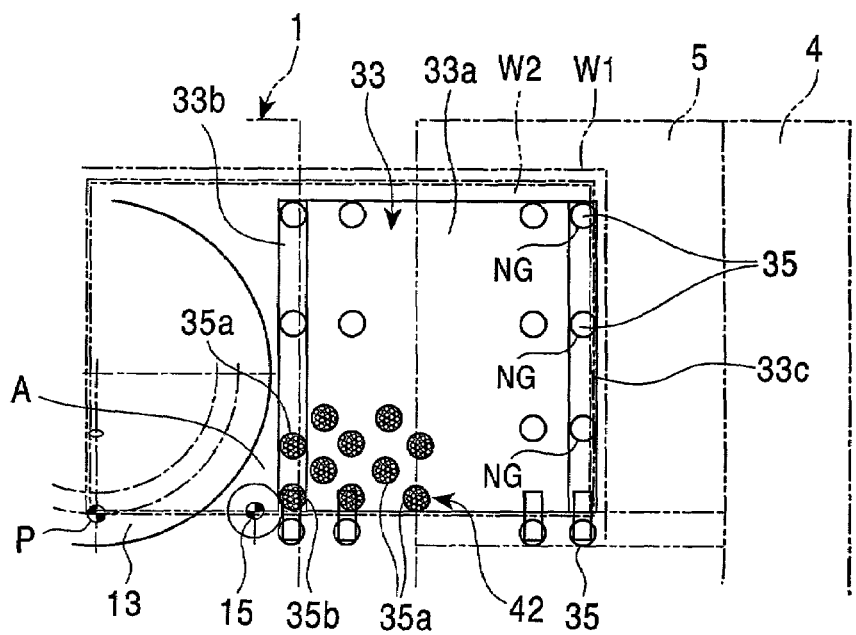

The suction-pad arrangement 36 is designed so that when the traveling body 27 is located at its advancing end position and the stretching frame 33b located in the advancing direction of the traveling body (left of the drawing) is withdrawn, the stretching frame 33b is located near the turret 13 and the subhead 15, as shown in each of FIGS. 9 to 11.

The suction pads 35 constituting the suction-pad arrangement 36 are each of a vacuum suction type and are connected to a suction device using piping. Of these suction pads 35, suction pads 35a and 35b each comprises a group of small pads 41. Each of the small pads 41 is a suction pad smaller than the entire suction pad 35 and has a suction function. Individual suction paths 43 for the respective small pads 41 (see FIG. 6) are branched from a single suction path but each have a contriction 44.

The suction pads 35a and 35b each comprising the group of small pads are concentrated in part of the suction-pad arrangement 36, constituting a small-pad-group concentrated section 42. The position of the small-pad-group concentrated section 42 preferably corresponds to the position of a product workpiece-ejection section A of the workpiece-machining device 1. In this example, the small-pad-group concentrated section 42 is located near one corner of the suction-pad arrangement 36, specifically, near the workpiece-machining device 1 and the corner at the bottom of the drawing.

In addition, the small-pad-group concentrated section 42 has the suction pads 35a and 35b arranged according to a specified criterion. The specified criterion is that, for example, the suction pads 35a and 35b are set so as to form a staggered arrangement with the general suction pads 35 and to have a smaller arrangement interval than the other general suction pads 35, as shown in FIG. 5.

At least one (in the illustrated example, one) of the suction pads 35a and 35b constituting the small-pad-group concentrated section 42 is an advancing suction pad 35a that can advance from the small-pad-group concentrated section 42. One of the remaining suction pads 35b is attached to the stretching frame 33b, and the other remaining suction pads 35a are attached to a concentrated section mounting member 45 provided on the main frame 33a.

The advancing suction pad 35b is attached to the stretching frame 33b via an advancing mechanism 46. The advancing mechanism 46 moves the advancing suction pad 35b back and forth relative to the small-pad-group concentrated section 42 and is composed of a swiveling arm 47 with the advancing suction pad 35b attached to its tip and an advancing drive means 48 for swiveling the swiveling arm 47 back and forth. The swiveling arm 47 is attached to the stretching frame 33b via a support member 50 so as to swivel horizontally around a support shaft 49 between a retreating position at which the arm extends along the stretching frame 33b as shown by the solid line in FIG. 5 and an advancing position at which the arm protrudes and swivels from the stretching frame 33b through a predetermined angle (e.g., 90 degrees) as shown by the chain line in FIG. 5. The advancing drive means 48 consists of a fluid pressure cylinder device. Since the swiveling arm 47 is swiveled to allow the advancing suction pad 35b to advance as described above, the advancing suction pad 35b can advance to between the turret 13 and subhead 15 of the workpiece-machining device 1 while the traveling body 27 is located at its advancing end.

Operations of the workpiece-transfer device 3 of the above configuration are described. First, loading and unloading operations are explained in brief. In the material-housing section 22 of the workpiece-storage device 2, material workpieces W1 are stacked on the material pallet 22a so as to form a lamination. To load the material workpieces W1 in the workpiece-machining device 1, the traveling body 27 is moved in directions X and Y so that the suction-pad arrangement 36 of the traveling body 27 is located above the material workpieces W1 in the material-housing section 22. The traveling body 27 is moved in the direction of the Y-axis by moving the movable table 26 in the direction of the Y-axis. (in the following description of operations, the description "the movement of the traveling body 27 in the direction of the Y-axis" also refers to the movement of the traveling body 27 effected by moving the movable table 26 in the direction of the Y-axis.) Then, the suction-pad arrangement 36 is lowered from the traveling body 27 to allow each suction pad 35 of the suction-pad arrangement 36 to suck the material workpiece W1. Subsequently, the suction-pad arrangement 36 is elevated again.

As described above, while the traveling body 27 is gripping the material workpiece W1, the traveling body 27 is moved toward the workpiece-machining device 1 and the movable table 26 is moved in the direction of the Y-axis. Consequently, the suction-pad arrangement 36 is lowered to load the material workpiece W1 in a predetermined loading position on the table 5 of the workpiece-machining device 1. In this example, the predetermined loading position is a position at which when the carriage 7 is located at its retreating end, two sides of the material workpiece W1 are in contact with the workpiece holder 12 and the end locator 17, respectively, as shown in FIG. 1. A reference position for this loading position corresponding to a corner of the workpiece is shown in FIG. 1 as an L-shaped mark M1. The material workpiece W1 is pressed against the workpiece holder 12 and the end locator 17 by moving the traveling body 27 in directions X and Y after the material workpiece W1 has been lowered onto the table 5.

The product workpiece W2 obtained by the workpiece-machining device 1 machining the material workpiece W1 is ejected from the predetermined product workpiece-ejection section A on the table 5 of the workpiece-machining device 1 or an arbitrary ejection position. When the subhead 5 is used to cut off the product workpiece W2, the predetermined product workpiece-ejection section A is near the subhead 5 as described above. The ejection is carried out by moving the traveling body 27 to the ejection section or position, lowering the suction-pad arrangement 36 to suck the product workpiece W2, elevating the suction-pad arrangement 36, then moving the traveling body 27 to above the product-housing section 21 of the workpiece-storage device 2, and lowering the pad arrangement 36 to release the sucking of the suction pads 35. When the workpiece-machining device 1 is used to cut out a plurality of product workpieces W2 from the material workpiece W1, the product materials W2 are stacked in the product housing section 21 so as to be arranged in the blanking condition for the material workpiece W1. When the product workpieces W2 are stacked in this manner, this can be freely carried out by moving the traveling body 27 because it can be moved in the orthogonal directions of the two axes (directions X and Y).

The skeleton S remaining on the table 5 after the machining by the workpiece-machining device 1 is unloaded by using the gripper 51 provided on the traveling body 27 to grip an edge of the skeleton S and moving the traveling body 27 over the table 5 and the auxiliary table 4 to the skeleton-housing section 23.

Figure 8A:
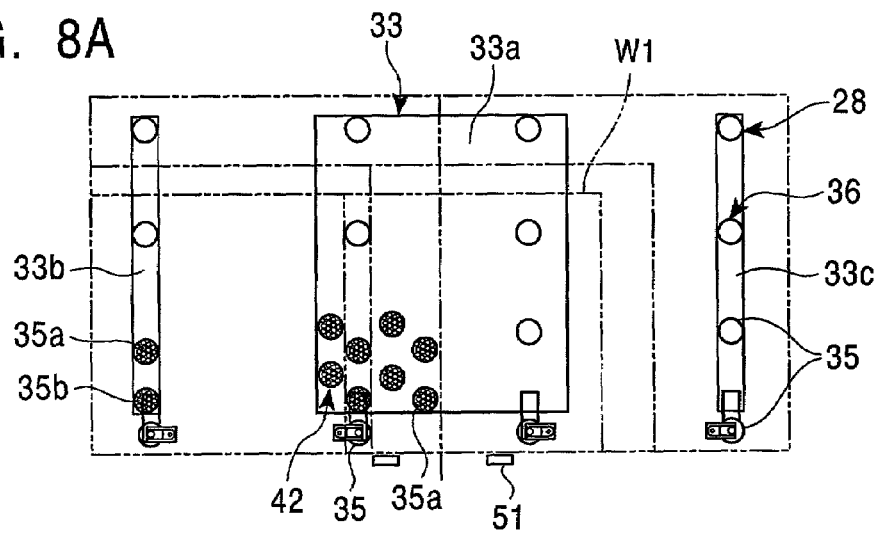
FIGS. 8A and 8C are explanatory drawings each showing in top view a form of material-loading operation by the workpiece-transfer device.
Figure 8B:
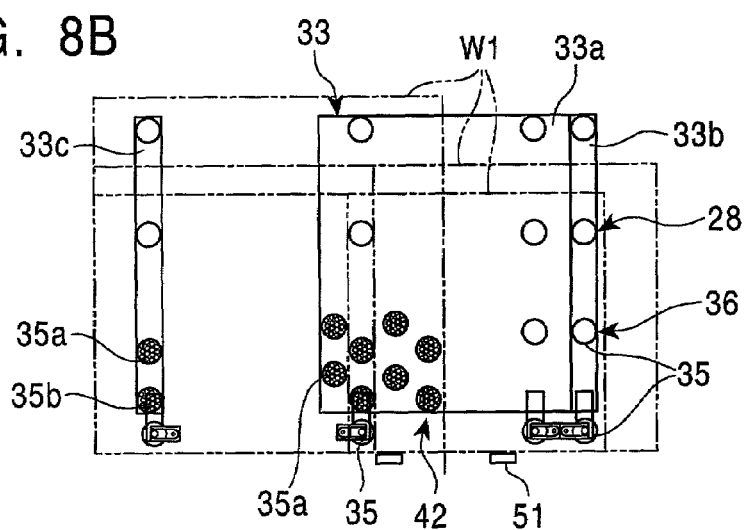
Figure 8C:
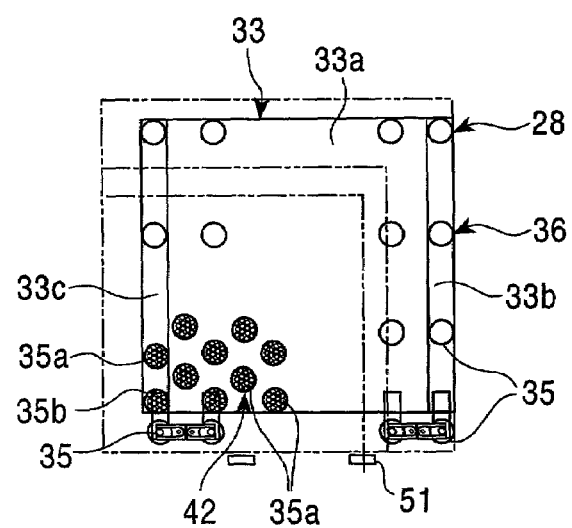

Next, the loading and unloading operations are explained in detail. FIG. 8 shows the various forms of the suction-pad arrangement 36 during the material loading. FIG. 8A shows a case in which the stretching frames 33b and 33c located on the respective sides of the suction-pad arrangement 36 are moved outward for unloading, i.e., the interval between the suction-pad arrangement and the suction pads on both sides is increased for unloading. FIG. 8B shows a case in which the interval between the suction-pad arrangement and the suction pads on one side is increased for unloading, and FIG. 8C shows a case in which the interval between the suction-pad arrangement and the suction pads on both sides is reduced for unloading. FIGS. 8A to 8C show the material workpieces W1 of three different sizes and shapes.

As shown in these figures, by increasing or reducing the suction pad interval of the suction-pad arrangement 36, the material workpiece 1 can be appropriately transferred depending on its size and shape, and can be loaded depending on the environment of the workpiece-machining device 1 without the needs for extra space for the suction-pad arrangement 36. For example, while the traveling body 27 is located at its advancing end closer to the workpiece-machining device 1, the material workpiece W1 can be loaded in a predetermined loading position at which the material workpiece W1 abuts on the end locator 17, regardless of the size and shape of the workpiece W1 and without the interference of the suction-pad arrangement 36 with the upper frame 14 of the workpiece-machining device 1.

For loading, in any of the cases shown in FIGS. 8A to 8C, only the general suction pads 35 of the suction-pad arrangement 36 may be used for suction, while the suction pads 35a and 35b in the group of small pads are stopped from suction. Alternatively, all the suction pads 35, 35a, and 35b may be used for suction.

Figure 11A:
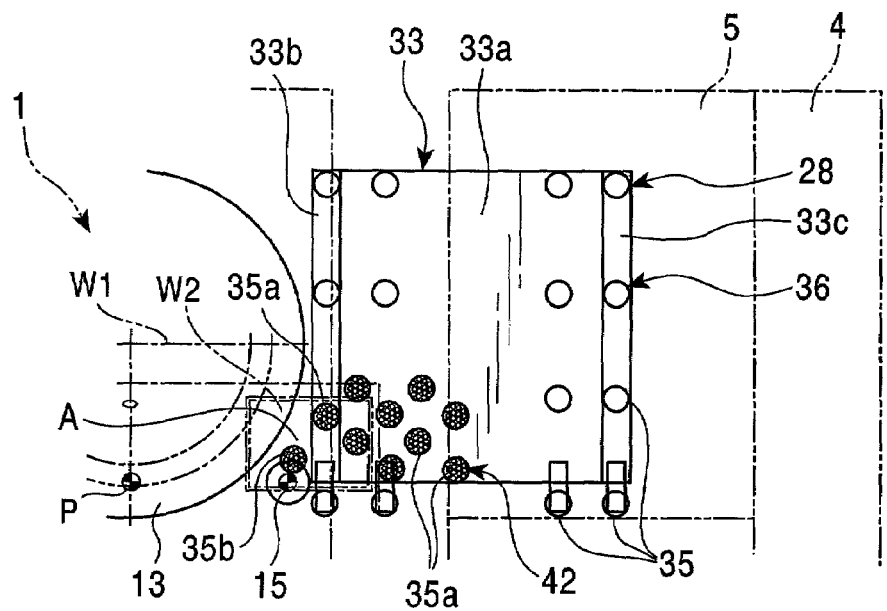
FIGS. 11A and 11B are explanatory drawings showing in top view yet another form of material-unloading operation by the workpiece-transfer device.

FIGS. 9 to 11 show the various forms the suction-pad arrangement 36 during product unloading. These figures all show a case in which the material workpiece W1 is cut into a plurality of or small product workpieces W2 and also show that the product workpieces W2 are located in the product-workpiece-unloading section A of the workpiece-machining device 1. In these figures, the suction pads 35 labeled with NG are stopped from suction by blocking the suction path. For example, in FIGS. 9A, 10A, and 11A, the suction pads 35 in the right end row come in contact with the product workpiece W2, and some of them also come in contact with the material workpiece W1. The suction pads 35 located at such positions may affect the operation if used for suction, so they are prevented from performing that function.

As shown in each of these figures, to unload the product workpieces W2 smaller than the material workpiece W1, one or both of the stretching frames 33b and 33c are withdrawn to reduce the interval between the suction pads on the respective sides in order to reduce the width of the suction-pad arrangement 36. Thus, when the product workpieces W2 are placed in the product-housing section 21 of the workpiece-storage device 2, this operation can be performed without the interference of the suction-pad arrangement 36 with the workpiece-storage device body 2a located around the workpiece-storage device 2 and consisting of frames. That is, when the product workpieces W2 are placed in the product-housing section 21, the suction-pad arrangement 36 must be situated off the center of the product-housing section 21 in order to place the plurality of product workpieces W2 in the blanking condition. Consequently, if there is a standing obstacle such as the workpiece-storage device body 2a of the workpiece-storage device 2 around the product-housing section 21, it is likely to interfere with the suction-pad arrangement 36. Such interference can be prevented by reducing the width of the suction-pad arrangement 36. In addition, in transferring a large material workpiece W1, stable transfer can be carried out by spreading the suction-pad arrangement 36 to maximize the suction area.

Figure 6A:
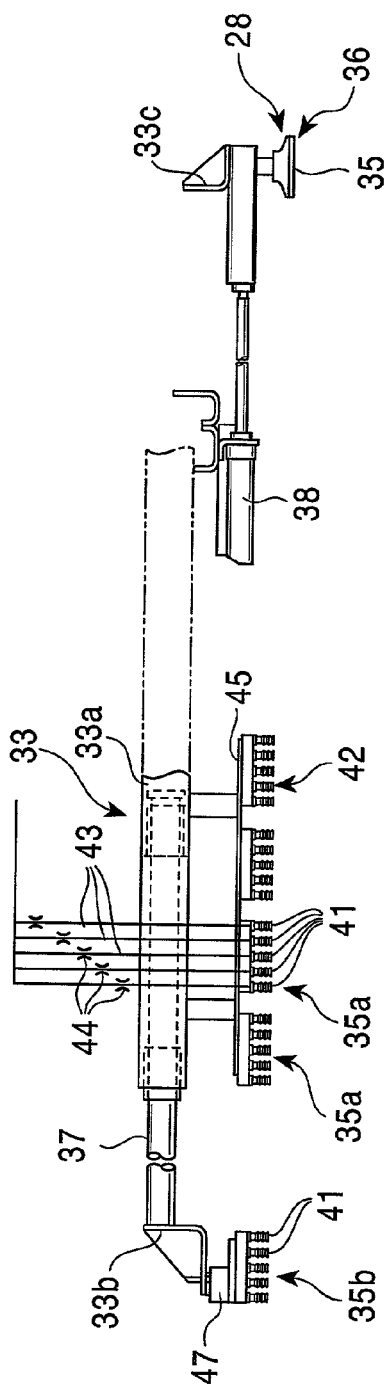
FIGS. 6A and 6B are partial front and side views of the suction-pad arrangement, respectively.
Figure 6B:
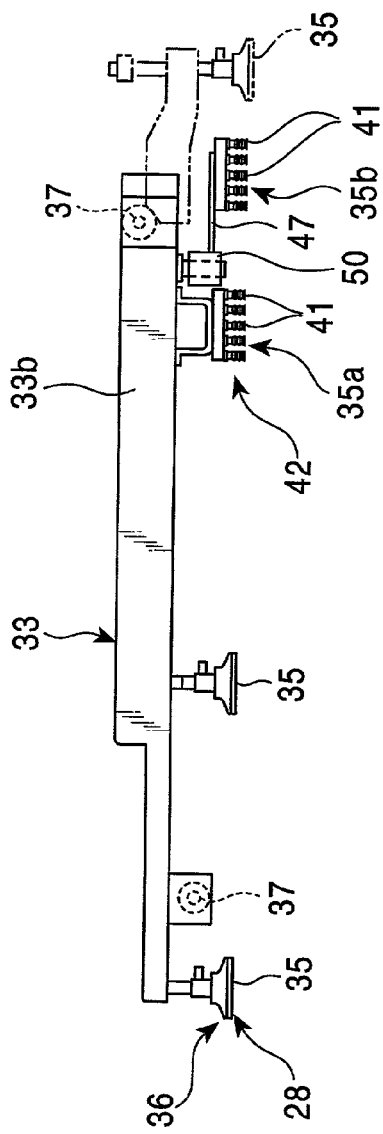
Figure 7A:
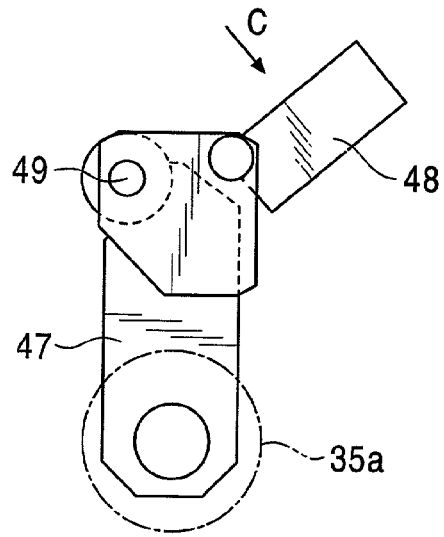
FIG. 7A is a top view of an advancing mechanism of the suction pad.
Figure 7B:
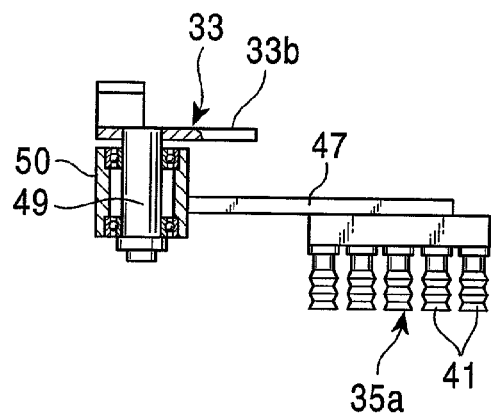
FIG. 7B is a sectional view of the advancing mechanism.
Figure 7C:
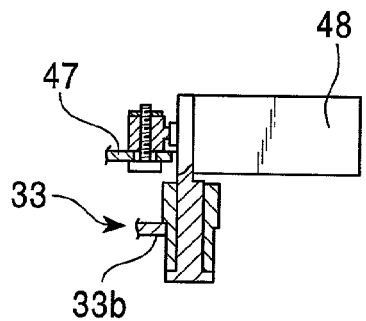
FIG. 7C is an exploded view of FIG. 7A as seen from direction C.

In addition, in the suction-pad arrangement 36, some of the suction pads 35a and 35b are composed of the group of small pads and the contriction 44 is provided for the suction path 43 of each small pad 41 (FIG. 6A). Thus, even if holes such as punch holes are formed in the product workpiece W2 and the suction pads 35a and 35b correspond to these holes, this product workpiece W2 can be reliably sucked and transferred without causing negative pressure leakage. In addition, since the suction pads 35a and 35b comprising the group of small pads are concentrated in part of the suction-pad arrangement 36, even a small product workpiece W2 such as that shown in FIG. 10C or 11A or 11B can be reliably sucked and transferred.

Figure 11B:
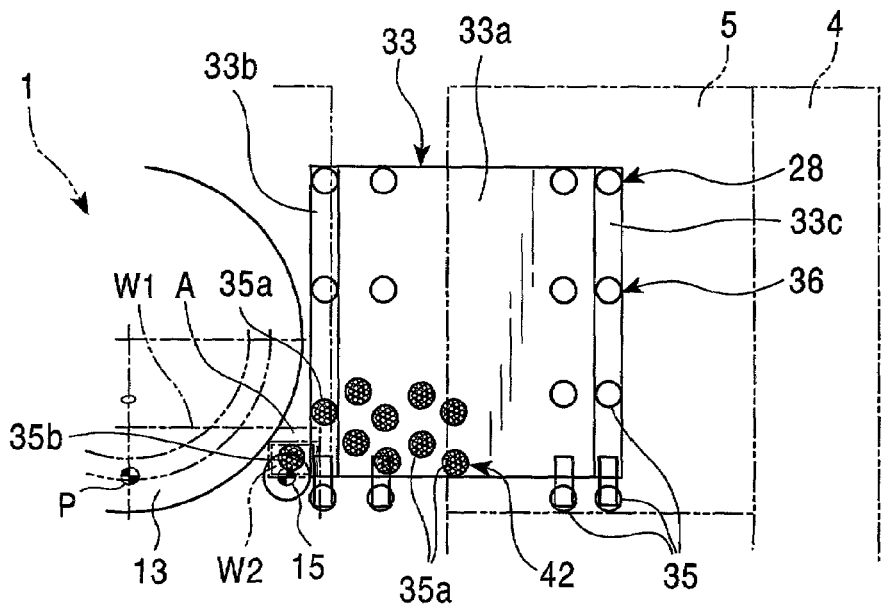

Some of the suction pads 35b in the small-pad-group concentrated section 42 of the suction-pad arrangement 36 are further attached to the swiveling arm 47 so as to advance from the small-pad-group concentrated section 42. Accordingly, in the case of a small product workpiece W2 such as that shown in FIG. 10C or 11A, the advancing suction pads 35b is moved to between the turret 13 and the subhead 15 to enable even and more reliable suction. In addition, as shown in FIG. 11B, the present device can suck even a small product workpiece W2 that is small enough to fit between the turret 13 and the subhead 15 and that can only be sucked by one suction pad. By withdrawing the advancing suction pads 35b toward the pad-mounting frame 33 when not required, these suction pads 35b are prevented from interfering with the upper frame 14 of the workpiece-machining device 1 or the workpiece-storage device body 2a of the workpiece-storage device 2 during the movement of the suction-pad arrangement 36.

The workpiece-transfer device according to the present invention is a workpiece-transfer device for loading a material workpiece in a workpiece-machining device and unloading a machined product workpiece from the workpiece-machining device, wherein the workpiece-transfer device includes a movement means with a rectangular coordinate system for moving a traveling body in a first direction along the direction in which the workpiece-machining device and a workpiece-storage device stand in a line as well as in a second horizontal direction orthogonal to the first direction, and wherein the traveling body includes a gripping means for gripping a material or product workpiece. This configuration provides both functions for loading and unloading workpieces without requiring the workpiece-storage device to have a function for replacing material and product workpieces with each other, and requires only a simple configuration and low costs.

If the workpiece-storage device comprises a product-housing section and a material-housing section provided in parallel in the second direction and the arrangement of the product and material-housing sections is set so as not to exceed the arrangement range of the workpiece-machining device along the second direction, then this configuration provides a square layout of the entire facility, including the workpiece-machining device and the workpiece-storage device, thereby enabling the floor area of the factory to be used more effectively.

In addition, if the rectangular coordinate system movement means can move the traveling body to the product and material-housing sections so that the traveling body can be moved into position and load a material workpiece gripped by the gripping means of the traveling body, relative to a positioning member of the workpiece-machining device, then this configuration can position and load the material workpiece on the workpiece-machining device without requiring an exclusive positioning mechanism such as positioning pads.

The invention claimed is:

1. A machine, comprising:
   (i) a workpiece-machining device for machining a material workpiece into a machined product workpiece, comprising:
      a machining section;
      a table located in the machining section; and
      a workpiece-feeding device for feeding the material workpiece from the table to the machining section and for ejecting the machined product workpiece from the machining section to the table; and
   (ii) a workpiece-storage device, comprising:
      a product-housing section for stacking the machined product workpiece;
      a material-housing section for stacking the material workpiece;
      a traveling body for traveling among the product-housing section, the material-housing section and the table;
      a gripping means provided on the traveling body for gripping the material workpiece and the machined product workpiece, wherein the gripping means loads or unloads the material workpiece and the machined product workpiece on or from the table of the workpiece-machining device; and
      a rectangular coordinate movement means for moving the traveling body among the product-housing section, the material-housing section and the table, in a first horizontal direction in which the workpiece-machining device and the workpiece-storage device are located in a line, and in a second horizontal direction orthogonal to the first horizontal direction, wherein the traveling body is moved simultaneously in the first and second directions.

2. A machine according to claim 1, wherein the workpiece-feeding device comprises a rail provided along the second horizontal direction, a carriage running on the rail, and a cross slide provided on the carriage such that the carriage is moved in the first horizontal direction.

3. A machine according to claim 1, wherein the workpiece-storage device further comprises a skeleton-housing section for stacking a skeleton after the machining.

4. A machine according to claim 3, wherein the skeleton-housing section is located in the second horizontal direction.

5. A machine according to claim 1, wherein the workpiece-storage device is located at the side of the workpiece-machining device.

6. A machine according to claim 1, wherein the workpiece-storage device is located at the side of the workpiece-machining device with an interval.

7. A machine including a workpiece-transfer device for transferring a material workpiece and a machined product workpiece between a workpiece-machining device and a workpiece-storage device, the workpiece-transfer device loading the material workpiece on the workpiece-machining device and unloading the machined product workpiece from the workpiece-machining device, comprising:
- a traveling body;
- a gripping means provided on the traveling body for gripping the material workpiece and the machined product workpiece; and
- a rectangular coordinate movement means for moving the traveling body in a first horizontal direction in which the workpiece-machining device and the workpiece-storage device are located in a line, and in a second horizontal direction orthogonal to the first horizontal direction, wherein the traveling body can be moved simultaneously in the first and second directions;
- wherein said workpiece-storage device is provided with a product-housing section for stacking the machined product workpiece and a material-housing section for stacking the material workpiece, the product-housing section being located parallel to the material-housing section, wherein both of the product-housing section and the material-housing section are arranged in the second horizontal direction, wherein said traveling body is moved simultaneously and above the product-housing section and the material-housing section on the workpiece-storage device, wherein the workpiece-machining device comprises a machining section, a table located in a machining section and a workpiece-feeding device for feeding a workpiece from the table to the machining section, wherein the traveling body travels among the product-housing section, the material-housing section and the table, wherein the workpiece-feeding device feeds the material workpiece from the table to the machining section and ejects the machined product workpiece from the machine section to the table, wherein the workpiece-transfer device loads or unloads the workpiece on or from the table of the workpiece-machining device.

8. A machine including a workpiece-transfer device as in claim 7, wherein the product and material-housing sections have a total length in the second horizontal direction not exceeding that of the said workpiece-machining device in the second horizontal direction.

9. A machine including a workpiece-transfer device as in claim 7, wherein the rectangular coordinate movement means moves said traveling body to said product and material-housing sections so that said traveling body can be moved to position and load a material workpiece gripped by the gripping means of said traveling body, relative to a positioning member of said workpiece-machining device.

10. A machine including a workpiece-transfer device as in claim 7, wherein said workpiece-storage device includes a skeleton-housing section in parallel with said second direction and on a side of the material-housing section opposed to said product-housing section.

11. A machine according to claim 7, wherein the workpiece-feeding device comprises a rail provided along the second horizontal direction, a carriage running on the rail, and a cross slide provided on the carriage such that the carriage is moved in the first horizontal direction.

12. A machine according to claim 7, wherein the workpiece-storage device is located at the side of the workpiece-machining device.

13. A machine according to claim 7, wherein the workpiece-storage device is located at the side of the workpiece-machining device with an interval.

* * * * *